United States Patent Office 3,531,749
Patented Sept. 29, 1970

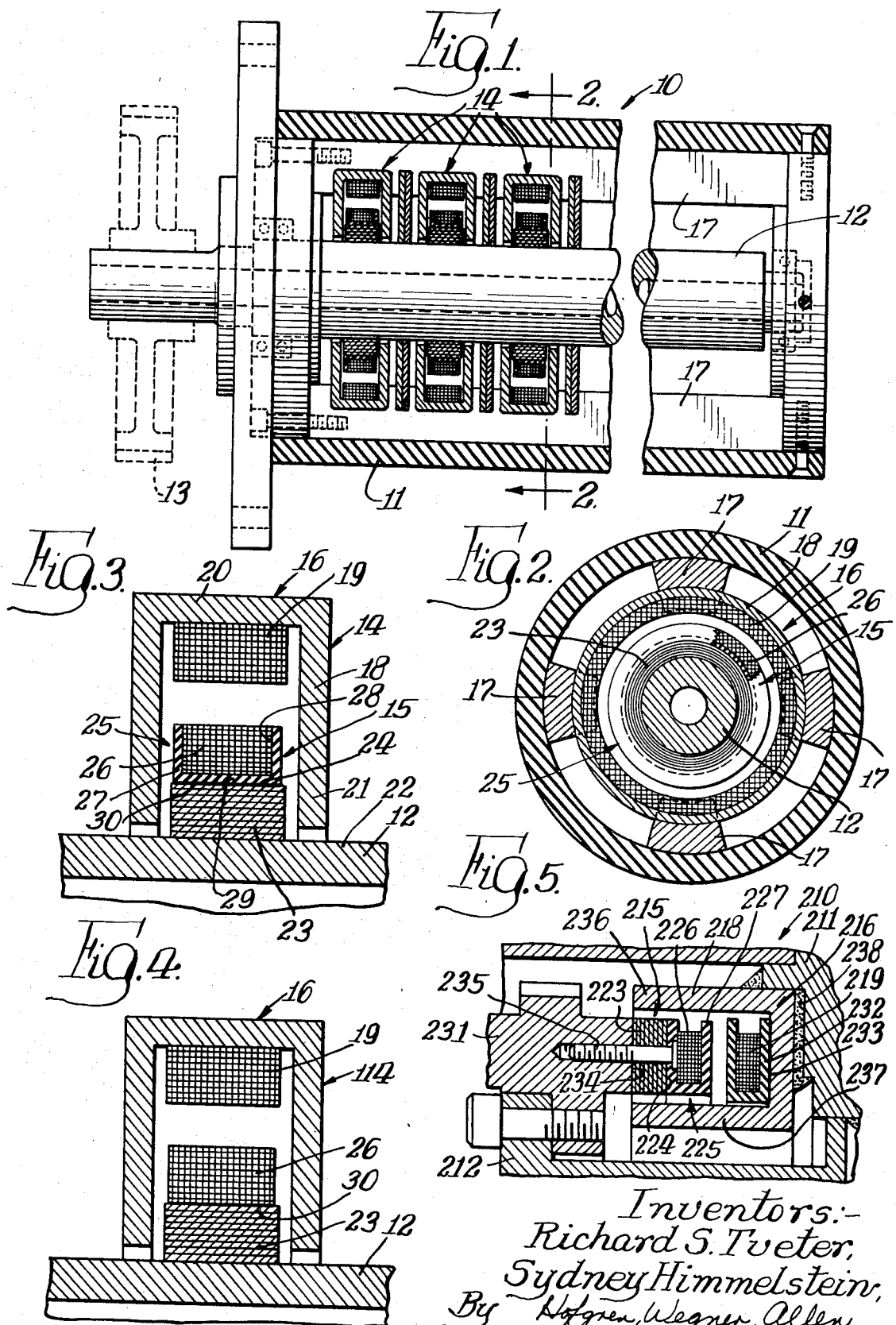

1

3,531,749
ROTOR STRUCTURE
Richard S. Tveter, Glenview, and Sydney Himmelstein, Park Ridge, Ill., assignors to S. Himmelstein and Company, a corporation of Illinois
Filed Mar. 27, 1969, Ser. No. 811,082
Int. Cl. H01f 21/06
U.S. Cl. 336—120                6 Claims

ABSTRACT OF THE DISCLOSURE

A rotor structure for use in electrical apparatus such as a rotory transformer. The rotor structure is carried on a rotatable member, such as a shaft, coaxially of a fixed stator coil. The rotor structure includes a coil secured to a rotor core formed of a magnetic material. The rotor coil projects substantially outwardly of the surface of the rotor core toward the stator coil.

BACKGROUND OF THE INVENTION

Field of the invention

This invention relates to rotor structures and in particular to rotor structures such as for use in rotary transformers.

Description of the prior art

In one form of rotary transformer as disclosed in Sydney Himmelstein, Howard S. Knaack and Richard S. Tveter U.S. Letters Pat. Re. 26,501 issued Dec. 19, 1968 for a Multi-Channel Rotary Transformer, a new and improved rotary transformer is provided for transferring electrical signals to and from a rotating portion of the apparatus. The rotor coil is carried on a rotor secured to a rotatable shaft for rotation concentrically within a fixed annular stator provided with a stator coil disposed for transformer action with the rotor coil. As disclosed, the rotor coil is carried in a suitable annular, radially outwardly opening recess to be substantially flush with the rotor core.

In our copending application, Ser. No. 770,044, filed Oct. 23, 1968 for a Rotary Transformer Construction, we further disclosed a modified form of rotary transformer wherein the rotor and stator coils are axially spaced. In said copending application, we have disclosed but not claimed an improved rotor construction wherein the rotor coil is mounted on a laminated rotor core so as to project substantially outwardly of the rotor core surface toward the stator coil.

SUMMARY OF THE INVENTION

The present invention is directed to the improved structural concept embodied in one form in said rotor core of said copending Tveter and Himmelstein aplication. The invention comprehends the provision of a rotor coil which selectively may be radially spaced or axially spaced from the stator coil and which is carried on a rotor core so as to project to substantially outwardly of the outer surface of the rotor core toward the stator coil.

More specifically, the present invention comprehends the provision, in a rotory transformer having a fixed stator disposed coaxially of a rotary member, of a rotor structure including an annular rotor core arranged to be coaxially fixed to the rotary member to be rotated therewith coaxially adjacent the stator, the rotor core being formed of a magnetic material and defining an outer surface, and an annular coil coaxially fixed to the rotor core to project to substantially outwardly of the outer surface toward the stator coil.

Still further more specifically, the invention comprehends such a rotory transformer wherein the rotor core surface is a radially outer surface thereof. Alternatively,

2 the invention comprehends the provision of such a rotary transformer wherein the outer core surface is an axially outer surface thereof.

Still further more specifically, the invention comprehends the provision of such a rotary transformer wherein the rotor core comprises selectively a magnetic steel band or a plurality of stacked magnetic steel bands. In one form, the rotor core may be formed of a ferrite material. The outer surface to which the rotor core is mounted may be right circularly cylindrical where the rotor coil is spaced radially from the stator coil and may be planar where the rotor coil is spaced axially from the stator coil.

Still further, the invention comprehends the provision of such a rotary transformer wherein the rotor coil includes an annular U-section coil form having its bright portion secured to the rotor core. The U-shaped coil form may open selectively radially outwardly or axially outwardly in the different forms of the rotary transformer as discussed above.

BRIEF DESCRIPTION OF THE DRAWING

Other features and advantages of the invention will be apparent from the following description taken in connection with the accompaying drawings wherein:

FIG. 1 is a fragmentary diametric section of a rotary transformer having a rotor core structure embodying the invention;

FIG. 2 is a transverse section thereof taken substantially along the line 2—2 of FIG. 1;

FIG. 3 is a fragmentary enlarged diametric section of the rotary transformer illustrating one of the transformer sections;

FIG. 4 is a view similar to that of FIG. 3 but showing a modified form of rotary transformer section embodying the invention; and FIG. 5 is a fragmentary enlarged diametric section of a modified form of a rotary transformer having a rotor coil structure embodying the invention.

DESCRIPTION OF THE PREFERRED EMBODIMENTS

In the exemplary embodiment of the invention as disclosed in FIGS. 1, 2 and 3 of the drawing, a rotary transformer generally designated 10 is shown to comprise a housing 11 journalling a rotatable member, illustratively a shaft 12, which may be driven by suitable means such as pulley 13. The rotary transformer may include a plurality of transformer sections generally designated 14 which are substantially identical. In describing the present invention, description of one such transformer section 14 is given in detail, it being understood that each of the other illustrated sections are similarly defined. As best seen in FIGS. 2 and 3, transformer section 14 includes a rotor structure 15 and a stator 16. The stator 16 is fixedly secured to the housing 11 by suitable supports 17. The stator includes a U-section annular core 18 which may be formed of a magnetic material such as a ferrite material. The stator further includes a stator coil 19 which is carried on the bight portion 20 of the stator core 18. The coil 19 comprises an annular coil and is carried by the stator core 18 to extend coaxially of the shaft 12. As shown in FIG. 3, the stator core legs 21 terminate short of the outer surface 22 of the shaft 12 to provide a running clearance.

As indicated briefly above, rotary transformer 10 includes an improved rotor structure 15 carried by the shaft 12 for cooperative transformer action with the stator 16 such as for in transferring electrical signals therebetween. More specifically, the rotor structure 15 includes a rotor core 23 which may be formed of a suitable magnetic material such as one or more bands of magnetic metal, such as conventional transformer steel, which may have a high tensile strength permitting rotation of the shaft 12 at high rates of speed. Where only low speeds are contemplated, the core may be formed of ferrite material. The core 23 may be formed of a single band of transformed steel in the form of a toroid on the shaft 12, or alternatively, may comprise a plurality of annular bands as by spirally wrapping the shaft with a thin core strap material.

The radially outer surface 24 of the rotor core 23 herein effectively comprises a right circularly cylindrical surface. A rotor coil structure 25 is carried on the outer surface 24 to project radially outwardly therefrom toward the stator coil 19. In the embodiment of FIG. 3, the rotor coil structure 25 includes an annular rotor coil 26 and an annular U-section coil form 27 in which the coil 26 is disposed. Illustratively, the coil 26 may be wound directly in the radially outwardly opening channel 28 defined by the coil form 27. The bight portion 29 of the coil form 27 may be secured to the outer surface 24 of the rotor core by suitable means such as epoxy cement 30.

The use of the coil form 27 is optional. Thus, as shown in FIG. 4, the rotor coil 26 may be secured directly to the rotor core 23 by suitable means such as the epoxy cement 30. Thus, the rotary transformer section 114 of FIG. 4 is similar to transformer section 14 of FIG. 3 and functions in a substantially similar manner.

Referring now to FIG. 5, a modified form of rotary transformer generally designated 210 embodying the invention is shown to comprise a rotary transformer having a shaft 212 carrying an isolation ring 231. The stator 216 includes an annular stator core 218 which is U-shaped in cross-section, opening parallel to the axis of the shaft 212 toward the isolation ring 231. The stator coil 219 may be provided in a suitable annular stator coil form 232 which may be U-shaped in cross-section, opening radially outwardly. The coil form 232 may be fixedly secured to the stator core 218 by suitable means, such as epoxy cement 233.

Rotary transformer 210 includes a rotor structure generally designated 215 including a rotor core 223 and a rotor coil structure generally designated 225. The rotor core 223 is carried on a planar surface 234 of the isolation ring 231 facing axially toward the stator 216. The coil structure 225 may include an annular U-section coil form 227 and an annular coil 226 received in the coil form 227. The coil form 227 may be secured to the outer surface 24 of the rotor core 223 by suitable means such as screw means 235 extending through the rotor core 223 for rigidly securing the entire rotor structure to the isolation ring 231. The rotor coil form 227 may open radially outwardly toward the outer leg 236 of the stator core 216. The inside diameter of the rotor core 223 may be slightly larger than the outside diameter of the inner leg 237 of the stator core leg 236 to provide running clearance therebetween. The rotor core 223 may comprise a plurality of thin laminations formed of a permeable material having high tensile strength, and illustratively may be formed of a plurality of thin annular sheets of conventional transformer steel. The stator 216 may be secured to the housing 211 by suitable means such as epoxy cement 238. As shown, the stator 216 is secured to have the legs 236 and 237 in overlapping relationship to the rotor.

Thus, in each of the embodiments of the invention as disclosed, the rotor coil is carried on the rotor core to project substantially therefrom toward the stator coil. The rotor core structure may be mounted on the outer surface so that the entire rotor core structure is disposed outwardly thereof. The rotor coil may be provided with or without a coil form as desired. The rotor coil structure may be secured to the rotor core by any suitable means as desired.

The present invention provides an improved rotor construction which is extremely simple and economical of manufacture while yet providing the improved functioning as discussed above.

The foregoing disclosure of specific embodiments is illustrative of the broad inventive concepts comprehended by the invention.

We claim:
1. In a rotary transformer having a fixed stator disposed coaxially about a rotary member, a rotor structure comprising: an annular rotor core coaxially fixed to the rotary member to be rotated therewith adjacent the stator, said rotor core being formed of a magnetic material and defining a radially outer surface; and annular coil means coaxially fixed to said rotor core outer surface and projecting radially outwardly of said surface toward the stator, said coil means being disposed fully externally of said rotor core.

2. The rotor structure of claim 1 wherein said rotor core comprises a substantially annularly extending magnetic steel band extending flatwise parallel to the axis of the rotor core.

3. The rotor structure of claim 1 wherein said rotor core comprises a plurality of radially overlying annular magnetic steel layers extending flatwise parallel to the axis of the rotor core.

4. The rotor structure of claim 1 wherein said coil means is secured to said outer surface.

5. The rotor structure of claim 1 wherein said outer surface is right circularly cylindrical.

6. The rotor structure of claim 1 wherein said coil means includes an annular U-section coil form, said coil form having a bight portion secured to said rotor core to open radially outwardly toward the stator and extend substantially outwardly of said rotor core.

References Cited
UNITED STATES PATENTS

| | | | |
|---|---|---|---|
| 1,394,901 | 10/1921 | Hobant | 336—234 XR |
| 1,454,005 | 5/1923 | Wenzel | 336—120 XR |
| 2,201,453 | 5/1940 | Putnam | 336—120 |
| 2,229,461 | 1/1941 | Kummich | 336—120 |
| 2,283,942 | 5/1942 | Morris | 336—119 XR |
| 2,671,886 | 3/1954 | Smith | 336—120 |
| 2,894,231 | 7/1959 | Krasno | 336—123 XR |
| 3,317,874 | 5/1967 | Honsinger | 336—83 XR |
| 3,348,181 | 10/1967 | Stromswold | 336—120 |

THOMAS J. KOZMA, Primary Examiner